United States Patent [19]

Iwawaki et al.

[11] 4,422,838
[45] Dec. 27, 1983

[54] EXTRUSION HEAD FOR USE IN BLOW MOLDING MACHINE

[75] Inventors: Akira Iwawaki; Eiji Horiuchi, both of Yokohama; Sadahiko Shinya, Ninomiya; Kinshiro Kojima, Kawasaki; Katsuo Kodama, Yokohama; Kotaro Kawarata, Yamato; Hisahiko Fukase, Tokyo, all of Japan

[73] Assignee: Ishikawajima-Harima Jukogyo Kabushiki Kaisha, Tokyo, Japan

[21] Appl. No.: 270,833

[22] Filed: Jun. 5, 1981

Related U.S. Application Data

[63] Continuation of Ser. No. 107,665, Dec. 27, 1979, abandoned.

[51] Int. Cl.³ .............................................. B29D 23/04
[52] U.S. Cl. ............................... 425/376 A; 264/540; 264/541; 264/209.2; 264/209.8; 425/532; 425/558; 425/561; 425/380; 425/381; 425/465; 425/466; 425/467
[58] Field of Search ............... 425/380, 382 R, 381, 425/561, 376 A, 466, 467, 532, 558, 465; 264/541, 540, 209.8, 209.2, 328.8

[56] References Cited

U.S. PATENT DOCUMENTS

| | | | |
|---|---|---|---|
| 3,281,896 | 11/1966 | Meyer et al. | 425/466 |
| 3,312,766 | 4/1967 | Stevens | 264/209.8 |
| 3,345,690 | 10/1967 | Hagen | 264/209.8 |
| 3,386,132 | 6/1968 | Fischer | 425/381 |
| 3,801,254 | 4/1974 | Godtner | 264/540 |
| 3,909,183 | 9/1975 | Hsu | 425/466 |
| 3,985,490 | 10/1976 | Kader | 425/466 |
| 4,038,017 | 7/1977 | Langecker | 425/467 |
| 4,063,865 | 12/1977 | Becker | 425/532 |
| 4,097,214 | 6/1978 | Hsu | 425/381 |
| 4,120,633 | 10/1978 | Feuerherm | 264/209.1 |
| 4,149,839 | 4/1979 | Iwawaki et al. | 425/532 |
| 4,152,104 | 5/1979 | Przytulla et al. | 425/467 |
| 4,165,212 | 8/1979 | Ziegler | 425/382 R |
| 4,208,178 | 6/1980 | Przytulla | 425/467 |
| 4,279,857 | 7/1981 | Feuerherm | 425/466 |

FOREIGN PATENT DOCUMENTS 2617898 11/1977 Fed. Rep. of Germany .
49-107363 10/1974 Japan .

Primary Examiner—Jeffery R. Thurlow
Attorney, Agent, or Firm—Alfred E. Miller

[57] ABSTRACT

An extrusion head for use in blow molding machines for molding parison having a single layer or wall or a plurality of layers or walls, in which a plunger is slidably interposed between a head body and a core and the plastic material is successively accumulated in an accumulation chamber defined between the extruding end of the plunger, the head body and the core so that the faster the plastic material is introduced into the extrusion head, the faster it is extruded.

3 Claims, 19 Drawing Figures

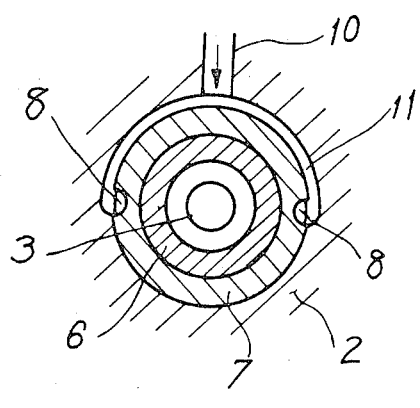
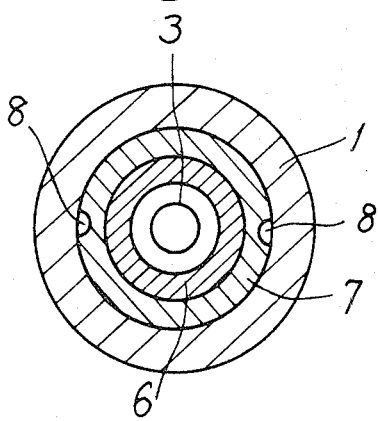
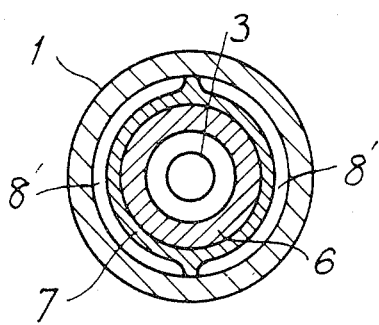
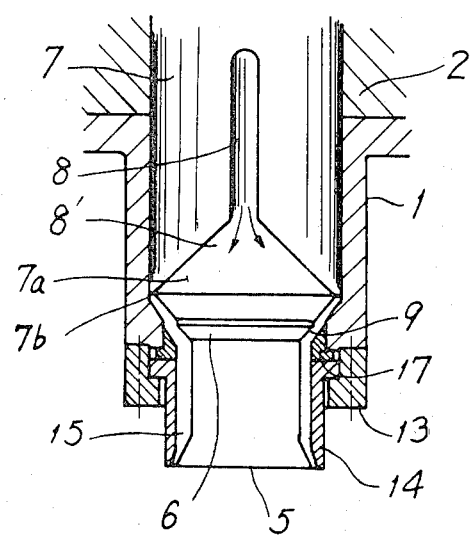
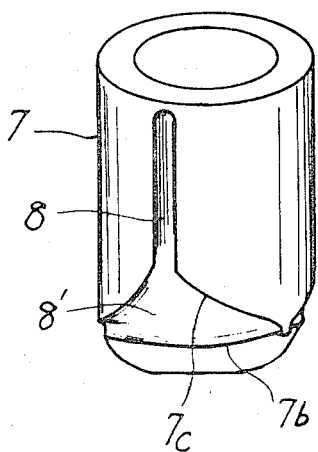

EXTRUSION HEAD FOR USE IN BLOW MOLDING MACHINE

This is a continuation of application Ser. No. 107,665, field Dec. 27, 1979 and now abandoned.

BACKGROUND OF THE INVENTION

The present invention relates to an extrusion head for use in blow molding machines.

Conventional blow molding machines for blow molding thermoplastics into tubular forms or parisons may be divided in general into the following three types depending upon their accumulator type extrusion heads:

(I) the type in which the plastic material is fed into the extrusion head from the lower portion thereof, is accumulated below the plunger, and then is extruded;

(II) the type in which the plastic material flows through an annular passage, whose length or distance is varied depending upon the stroke of the plunger, below the plunger to be accumulated and then extruded; and (III) the type in which the plunger has a double wall which defines an annular passage into which is accumulated the plastic material and from which is extruded the plastic material.

The extrusion head of the type (I) is disclosed in detail in for example in Japanese Patent Public Disclosure No. 49-107363, U.S. Pat. No. 3,386,132, as well as other disclosures. In FIG. 1, a prior art construction is shown having a cylindrical plunger c, which is annular in cross section, and is disposed between a head body a and a core b for vertical reciprocal movement, and the plastic material, which is plasticized or fluidized, is fed through a feed port d into the space defined below the plunger c, whereby the latter is caused to move upwards. Thereafter, the plunger c is forced to move downward whereby the plastic material is forced to flow through the nozzle f defined between the head body a and a mandrel e formed integral with the bore b, to thereby form a parison.

The extrusion head of the type (I) described above has certain disadvantages hereinafter described. That is, the first plastic material fed into the extrusion head through the feed port d remains in contact with the lower end surfaces of the plunger and the succeeding plastic material is accumulated below the previously fed plastic material. As a result, when the plunger c moves downward to extrude thus accumulated plastic material, the previously fed plastic material is extruded after the succeedingly fed plastic material. That is, the faster the plastic material is fed, the later it is extruded or the later the plastic material is fed, the faster it is extruded. As a result, the surface quality, dimensions, stability, strength etc. of the parison thus extruded are adversely affected.

In other words, in order to improve the desired requirements on parisons, such as surface quality, dimension, stability, strength etc., the plastic material must remain for a predetermined time interval within the extrusion head and the remaining time interval must be uniform from one shot to another. However, with the extrusion head of the type (I), the longer the plastic material remains in the extrusion head, the later it is extruded so that the plastic material fed into the extrusion head is not processed uniformly. As a result, the plastic material which has remained in the extrusion head for a relatively short time interval is extruded into a parison with enhanced surface roughness. On the other hand when the plastic material remains in the extrusion head for too a long time interval, its qualities are degraded. In addition, the seams or boundaries between the plastic material which has remained in the nozzle f and that accumulated above the nozzle f are developed when the plastic material is being extruded through the nozzle f so that the extruded parison has surfaces whose qualities are apparently different from each other. As a result, the end of finished product is not uniform in quality.

The extrusion head of the type (II) is disclosed in detail in for example in U.S. Pat. No. 3,611,494, and Japanese Utility Model Publication No. 52-26549. That is, as shown in prior art FIG. 2, the cylindrical plunger c, which is annular in cross section, is disposed for vertical movement between the head body a and the core b in such a way that an annular passage g may be defined between the plunger c and the core b. The length of distance of the annular passage g varies depending upon the stroke of the plunger c. The plastic material is fed into the extrusion head through the feed port d which is located at the upper portion of the head body a so that the plastic material may be accumulated successively in the annular passage g from the bottom protion thereof. As the plastic material is accumulated, the plunger c is raised upwards. When the plunger c is forced downward, the plastic material which has been fed into the extrusion head faster is extruded faster. That is, the faster the plastic material is fed, the faster it is extruded. As a result, the extrusion head of the type (II) is advantageous over the type (I) in that the plastic material may more uniformly remain for a predetermined time interval in the extrusion head.

However the extrusion head of the type (II) has also some disadvantages to be described hereinbelow. That is, since the annular passage g is defined between the core b and the plunger c, the plastic material tends to adhere the wall surfaces h of the annular passage g and it is almost impossible for the plunger c to scrape off the plastic material adhered to the wall surfaces h. As a result, when plastic materials of different compositions or colors are used, a cleaning agent or the like may be used in large quantity to remove the plastic material adhering to the wall surfaces h, with the resultant increase in molding cost.

The extrusion head of the type (III) is disclosed in detail in for instance U.S. Pat. No. 3,985,490. As shown in prior art FIG. 3, the plunger c is of the double-wall construction and has a longitudinal groove i which is in communication with the feed port d. The plastic material fed through the feed port d is introduced into the annular passage j defined between the walls of the plunger c and is accumulated successively from the bottom portion of the annular passage j, through the passage between the longitudinal groove i and the annular passage j.

The extrusion head, with the above construction, is advantageous in that the faster the plastic material is fed the faster it is extruded, but has a disadvantage to be described below. That is, as with the extrusion head of the type (II), the plunger c itself cannot scrape off the plastic materials adhering to the wall surfaces of the annular passage j so that a cleaning agent or the like must be used in a large quantity in order to remove the plastic materials adhering to the wall surfaces. In addition, the plastic material is introduced into the annular passage j through the longitudinal groove which in turn is communicated with the fed port d so that when the plunger c is not reciprocated over its full stroke, there remains the plastic material in the longitudinal groove i which will not flow at all. Since the plastic material remains for too a long time interval, its degradation or deterioration results. Furthermore, the plastic material which has flowed down through the longitudinal groove i can be permitted to flow into the annular passage j only when the plunger c is lifted to its upper stroke limit. As a result, the faster the plastic material is fed into the longitudinal groove i, the latter it is charged into the annular passage j.

The present invention overcomes the above described disadvantages as well as other problems encountered in the prior art extrusion heads in blow molding machines, and has for its object to provide an extrusion head for use in blow molding machines which may effectively scrape off or otherwise remove the plastic material adhering to the wall surfaces, thereby preventing the plastic material from remaining in the extrusion head over a predetermined time interval and reducing the quantity of a cleaning agent or the like required for removing the plastic material adhering to the wall surfaces when the plastic material of different composition or color is used and which may ensure a faster charged and faster extruded operation, thereby ensuring that all the plastic material fed may uniformly remain for a predetermined time interval. The present invention will become more apparent from the following description of some preferred embodiments thereof taken in conjunction with the accompanying drawings.

FIG. 5 is a sectional view taken along the line A—A of FIG. 4;

FIG. 6 is a sectional view taken along the line B—B of FIG. 4;

FIG. 7 is a sectional view taken along the line C—C of FIG. 4;

FIG. 8 is a side elevation view of a modification of a plunger used in the present invention;

FIG. 9 is a perspective view thereof;

Figure 1:
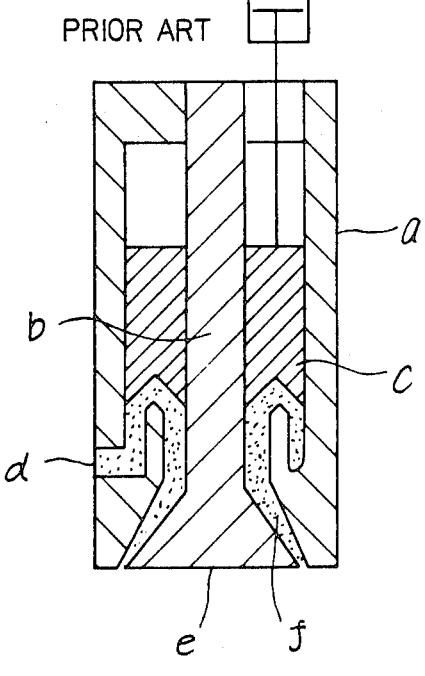
FIGS. 1 through 3 are schematic sectional views of the prior art extrusion heads for use in blow molding machines.
Figure 2:
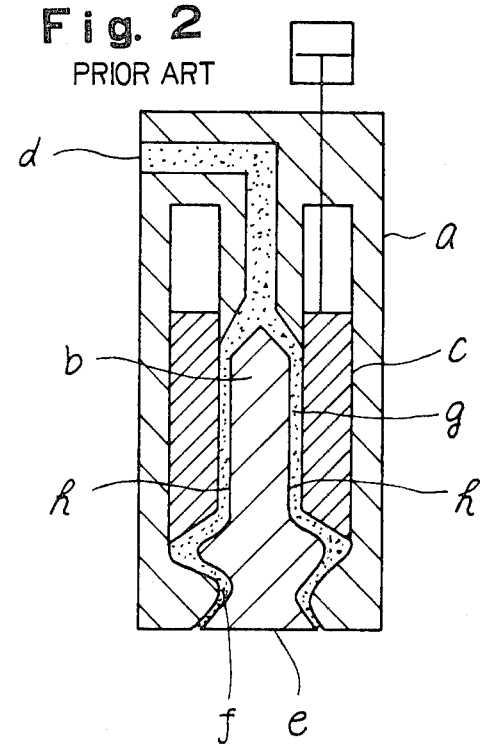
Figure 3:
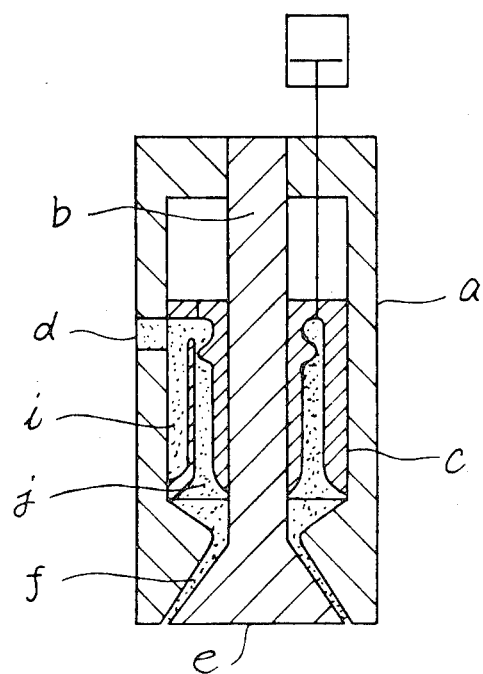

Referring first to FIGS. 4 through 9 in which the same reference numerals are used to designate similar parts throughout the Figure, reference numeral 1 denotes a head body; 2, a head body support plate having a center aperture or opening equal in inner diameter to the head body 1; 3, a rod of a servocylinder 4; 5, a mandrel securely attached to the lower end of the rod 3; 6, a core which is disposed stationarily in the head body 1 coaxially thereof and through which is extended the rod 3 of the servocylinder 4; 7, a hollow cylindrical plunger which is slidably fitted into the bore of the head body 1 and the center opening of the support plate 2 and slidably fitted over the core 6, the upper end of the plunger 7 being extended through the center aperature of the support plate 2 and securely joined to a plunger support plate 18. The plunger 7 has two longitudinal grooves 8 which are diametrically spaced apart from each other as best shown in FIGS. 5 and 6 and which are extended downwards and terminated into a flared portion 8' defined by the downwardly diverging edges 7c. The plunger 7 has a reduced-diameter lower end portion and is terminated into a throttle portion 7b with the small end down as best shown in FIGS. 8 and 9, whereby a plastic material accumulation chamber 9 may be defined between the throttle portion 7b of the plunger 7 and the bore wall of the head body 1. Instead of flaring the lower end portion 8', the longitudinal groove 8 may be made straight, but the longitudinal grooves 8 with the flared portions 8' are advantageous in that the plastic material may be uniformly distributed in the accumulation chamber 9.

The plastic material, which is fluidized or plasticized and supplied from an extruding machine (not shown), flows through a feed port 10 and a semicircular distribution groove 11 formed in the wall surface of the center opening of the support plate 2 into the longitudinal grooves 8 recessed in the peripheral surface of the plunger 7. In order to prevent the leakage of the plastic material from the longitudinal groove 8, a sealing block 12 is securely joined to the wall surface of the center aperture of the support plate 2 and is snugly and slidably fitted into the longitudinal groove 8. Thus the longitudinal groove 8 is sealed with the head body 1, the support plate 2 and the sealing block 12.

A die 14 is securely mounted on a retainer 13 which in turn is securely joined to the lower end of the head body 1. An annular nozzle 15 is therefore defined between the die 14 and the mandrel 5 so as to extrude a parison 16. A guide block 17 is fitted between the lower end of the head body 1 and the die 14 so that the plastic material may smoothly flow into the annular nozzle 15.

Mounted on a support plate 20 are not only the servocylinder 4 but also extrusion cylinders 19 whose rods are connected to the plunger mounting or support plate 18 so that the latter may be vertically reciprocated as will be described in detail hereinafter.

Next the mode of operation of the present invention with the above construction will be discribed. The fluidized or molten plastic material is extruded from the extruding machine (not shown) and charged through the feed port 10 into the extrusion head. The charged plastic material flows through the distribution passage 11 into the longitudinal grooves 8 of the plunger 7. The plastic material flows down through the longitudinal grooves 8 into the accumulation chamber 9. At the beginning of the feeding of the plastic materials, the injection cylinders 19 have been extended and the plunger 7 is at the end of the downward stroke thereof. The plastic material flowing down the longitudinal groove 8 is spread in the flared end portion 8' and flows into the accumulation chamber 9 across the throttle portion 7b of the plunger 7.

As the plastic material is continuously charged and accumulated in the accumulation chamber 9 in the manner described above, the plunger 7 is gradually lifted and the accumulation chamber 9 is also increased in volume, whereby the plastic material may be circumferentially distributed and accumulated. As the plunger 7 is lifted, the longitudinal groove 8 is also lifted, emerging out of the support plate 2, but as described elsewhere the sealing block 12 is fitted into the longitudinal groove 8 to positively prevent the leakage of the plastic material to the exterior of the extrusion head, so that the plastic material is prevented from attaching to the portion 8″ of the longitudinal groove 8 emerging out of the support plate 2, whereby the plastic material may be prevented from remaining in the longitudinal groove 8 for a long time interval.

After the plastic material has been charged and accumulated in a predetermined quantity, the injection cylinders 19 are actuated to force down the plunger 7 so that the accumulated plastic material is extruded through the annular nozzle 15 into the parison. In this case, the faster the plastic material is charged and accumulated, the faster it is extruded or discharged. As a result, the plastic material may remain in the extrusion head for a predetermined time interval uniformly, whereby the uniform and high quality parison 16 may be obtained.

As described above, according to the first embodiment of the present invention, the plastic material flows into the accumulation chamber 9 through the longitudinal grooves 8 recessed in the cylindrical wall of the plunger 7. As a result, even when the plastic material adheres to the head body 1 and the core 6, it may be easily scraped off by the plunger 7 itself, or more particularly by the downwardly diverging or tapered edges 7c, as seen in FIG. 9. The longitudinal groove 8 has a relatively small area of contact surface with the plastic material and the plastic material flows through the longitudinal groove 8 at a relatively high velocity. Furthermore, there does exist the difference in velocity between the plastic material on the inner surface of the head body 1 and that in the longitudinal groove 8 of the plunger 7 when the latter is reciprocated. As a result, the plastic material may be positively prevented from remaining in the longitudinal grooves 8. Therefore, when the plastic material of different composition or color is to be used, the previously used plastic material remaining in the extrusion head may be easily removed. Moreover, cleaning of the longitudinal grooves 8 may be very simple.

Figure 4:
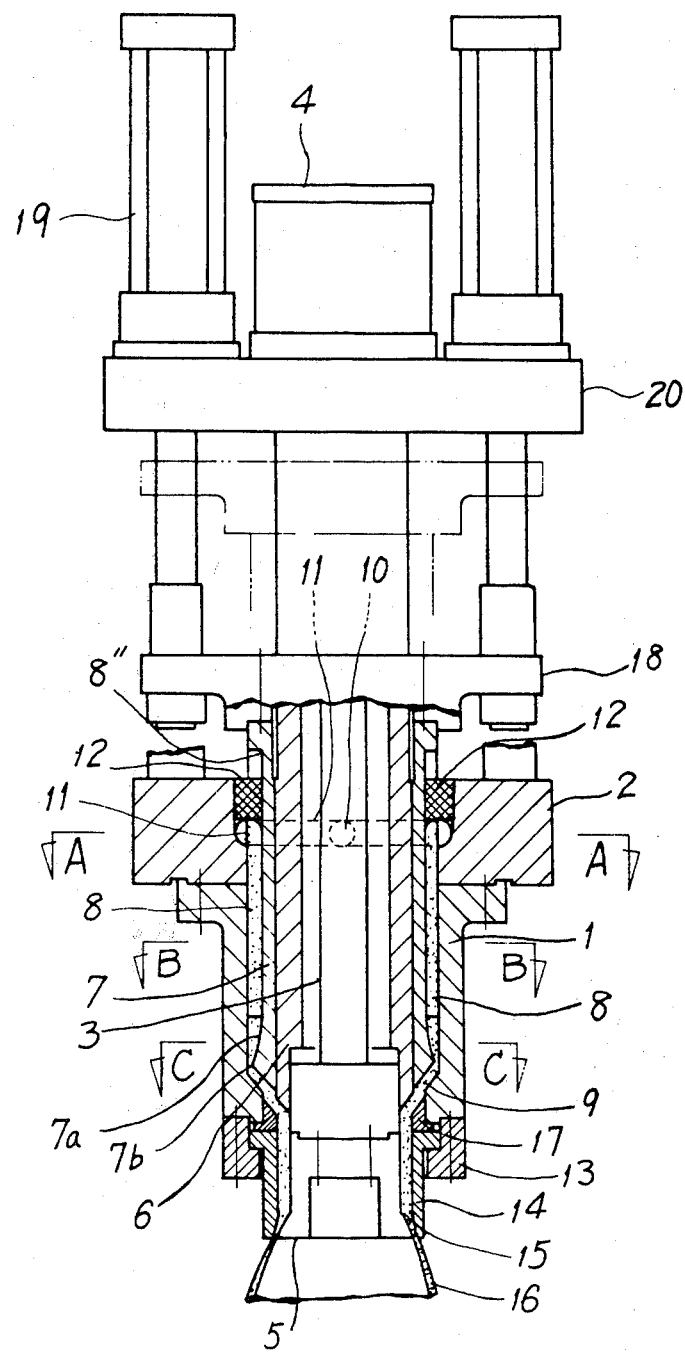
FIG. 4 is a front view, partly in section, of a first embodiment of an extrusion head for use in blow molding machines in accordance with the present invention.
Figure 10:
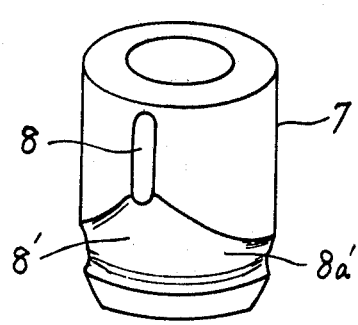
FIGS. 10 through 14 are perspective views of some further modifications, respectively, of a plunger used in the present invention.

When the lower end portion of the longitudinal groove 8 is flared as indicated by 8′ and the depth of the flared portion 8′ is made gradually shallower towards the throttle portion 7b of the plunger as best indicated by 7a in FIG. 4, the plastic material flowing down through the longitudinal grooves 8 may be uniformly distributed and accumulated in the accumulation chamber 9.

Figure 11:
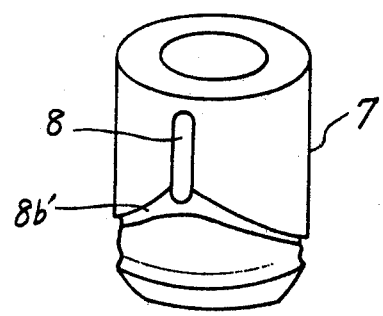
Figure 12:
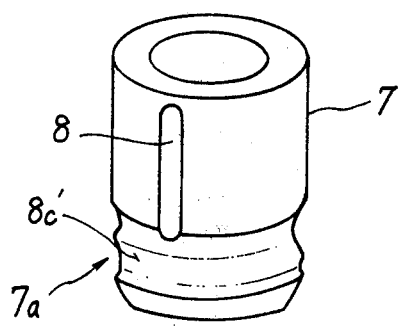
Figure 13:
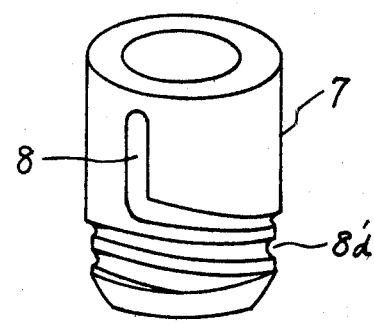
Figure 14:
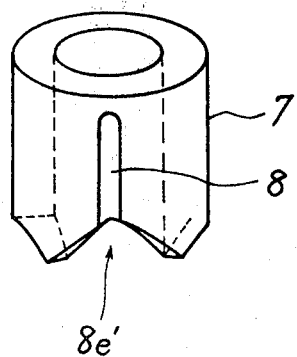

In FIGS. 10 through 14, some modifications of the plunger 7 of the present invention are shown. In the first embodiment described hereinbefore in conjunction with FIGS. 4 through 9, the flared lower end portions 8′ of the longitudinal grooves 8 are shown as being not in communication with each other, but in the modification shown in FIG. 10, the flared end portions 8′ are intercommunicated with each other to form an annular recess 8a′. The modification shown in FIG. 11 is substantially similar to that shown in FIG. 10 except that an additional annular groove 8b′ is formed along the upper edge of the annular recess 8a′. The modification shown in FIG. 12 is also substantially similar to that shown in FIG. 10 except that an annular recess 8c′ is extended circumferentially in a uniform width. In the modification shown in FIG. 13, spiral grooves 8d′ are recessed in the cylindrical wall of the plunger 7 adjacent to the throttle portion 7b thereof and the lower ends of the longitudinal or axial grooves 8 communicate with the upper ends of the helical grooves 8d′. In the modification shown in FIG. 14, no circumferential recess is provided, but the plunger 7 is notched as indicated at 8e′ in such a way that the plastic material flowing down through the axial groove 8 may be distributed through the notchs 8e′. Any of the above-described modifications serves to positively distribute and accumulate the plastic material flowing down through the axial groove 8 into the accumulation chamber 9.

Figure 15:
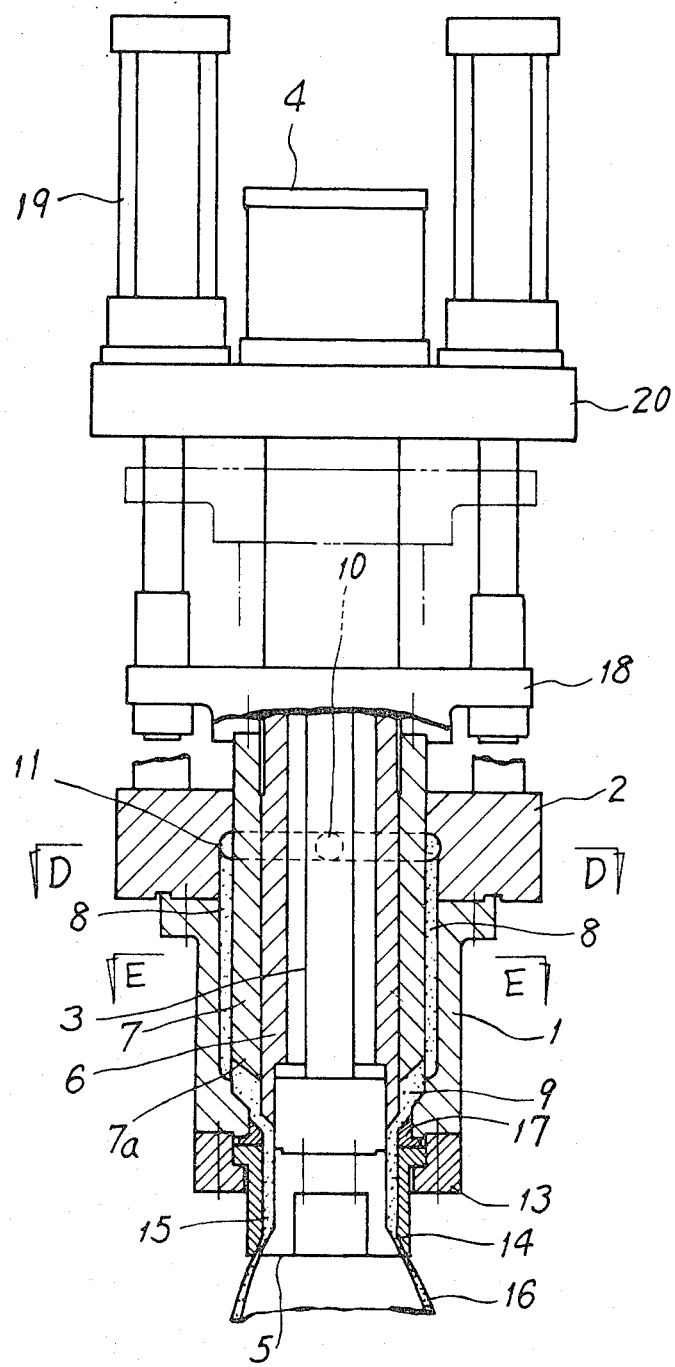
FIG. 15 is a side elevation view, partly in section, of a second embodiment of the present invention.
Figure 16:
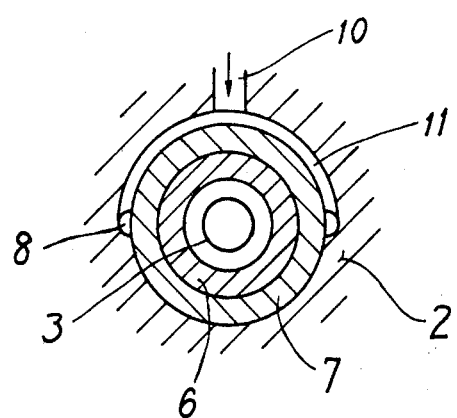
FIG. 16 is a sectional view, taken along the line D—D of FIG. 15.
Figure 17:
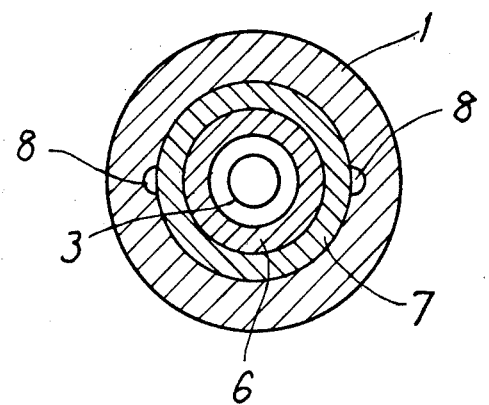
FIG. 17 is a sectional view taken along the line E—E of FIG. 15.

The second embodiment shown in FIGS. 15 through 17 is substantially similar in construction to the first embodiment described hereinbefore and shown in FIG. 4, except that the axial or longitudinal grooves 8 are recessed in the inner cylindrical walls of the head body 1 and the support plate 2 instead of in the outer cylindrical wall of the plunger 7. As with the first embodiment, the axial or longitudinal grooves 8 are in communication with the distribution passage 11 which in turn is in communication with the feed port 10. The lower ends of the axial grooves 8 are in communication with the accumulation chamber 9 defined between the head body 1, the core 6 and the tapered lower end of the plunger 7.

The mode of operation and effects of the second embodiment are substantially similar to those of the first embodiment described hereinbefore. It is ensured that the faster the plastic material is charged into the extrusion head, the faster it is extruded or discharged, whereby all the plastic material for one shot may remain uniformly for a predetermined time interval. Furthermore the plastic material may flow through the axial grooves 8 at high velocities so that the plastic material may be prevented from remaining in excess of the predetermined time interval in the extrusion head and prevented from adhering the wall surfaces thereof. It should be noted that according to the second embodiment, the axial grooves 8 are recessed in the stationary members 1 and 2 and have their upper ends always in communication with the plastic material distribution groove 11 so that the sealing blocks 12 which are used in the first embodiment may be eliminated.

Figure 18:
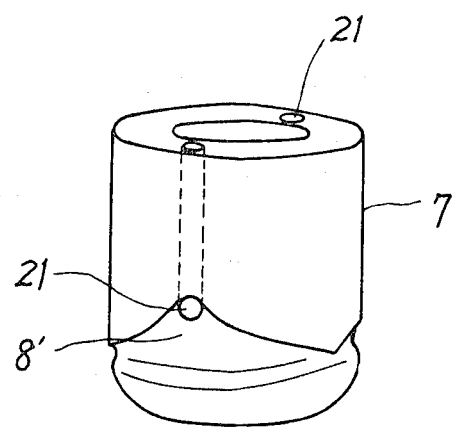
FIGS. 18 and 19 are perspective views of further modifications, respectively, of a plunger used in the present invention.
Figure 19:
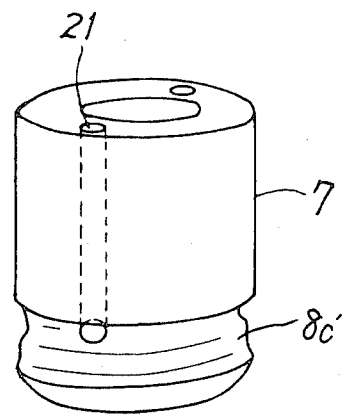

In addition of the various types of plunger 7, the plungers 7 of the types shown in FIGS. 18 and 19 may be also equally employed in the present invention. In the modification shown in FIG. 18, the flared recesses 8′ similar to those of the first embodiment shown in FIG. 9 are formed in the outside cylindrical wall of the plunger 7 adjacent to the tapered lower end thereof, and instead of the longitudinal grooves 8 axial holes 21 are extended through the wall of the plunger 7 in such a way that their lower ends are opened at the vertexes of the flared recesses 8′. The plastic material flows down the axial holes 21 and discharges into the flared recesses 8′ from which the plastic material is uniformly distributed and accumulated in the accumulation chamber 9.

The modification shown in FIG. 19 is substantially similar in construction to that shown in FIG. 18 except that instead of the flared recesses 8′, an annular groove 8c′ with a uniform width are recessed and the lower ends of the axial holes 21 are opened into the annular groove 8c′.

When either of the plungers 7 shown in FIGS. 18 and 19 is used, means must be provided to direct the plastic material from the feed port 10 to the upper ends of the axial holes 21.

The plungers of the types shown in FIGS. 18 and 19 are advantageous in that during down stroke they may completely remove or scrape off the plastic material adhering to the inside wall surfaces of the body 1 and to the outside cylindrical wall surface of the core 6, whereby the plastic material may be prevented from remaining in the extrusion head in excess of a predetermined time interval. The plastic material which adheres to the wall surfaces of the axial holes 21 may be readily removed or scraped off by the plastic material flowing at high velocities through the axial holes 21 having a relatively very small cross sectional area.

Furthermore, even though not shown, a hollow cylindrical plunger 7 is formed with flared recesses or annular or helical grooves of the types described hereinbefore in conjunction with FIGS. 9 through 14 and radial holes are drilled or otherwise formed through the wall of the plunger 7 in such a way that one end of each radial hole opens at the flared recess or the like 8' while the other end opens at the inside wall surface of the plunger 7. Axial grooves are extended through the wall of the core 6 in such a way that they may be always in communication through axial grooves on the inside wall surface of the plunger 7 with the inner ends of the radial hole regardless of the stroke of the plunger 7. Then the plastic material fed through the feed port 10 may flow through the distribution passage 11 and down through the axial grooves in the core, the axial grooves on the inner wall surface of the plunger 7 and the radial holes and into the flared recesses or the like 8' from which the plastic material may be uniformly distributed and accumulated in the acceleration chamber 9, as with the embodiments and modifications described hereinbefore.

Furthermore, the head body 1 and the plunger 7 may be provided with the arrangement similar to that just described above.

In addition to the embodiments and their modifications described above, various variations and modifications may be effected without departing from the true spirit of the present invention. For instance, the number of the axial grooves or radial holes may be suitably selected as needs demand. Various means may be employed to uniformly distribute and accumulate the plastic material in the accumulation chamber below the plunger. Up to this point the present invention has been described in conjunction with molding a parison having only one wall or layer, but it is to be understood that the present invention may be equally applied to the molding machines for molding parisons having two or more layers of different compositions and/or colors.

The effects, features and advantages of the present invention may be summarized as follows:

(1) The plastic material flows down below the plunger not through an annular passage, but through axial grooves or radial holes so that the adhesion of the plastic material to the wall surfaces may be minimized. In addition, the reciprocal movement of the plunger may scrape off or otherwise remove the plastic material adhering to the inside cylindrical surface of the head and the outside cylindrical surface of the core.

(2) The axially extended grooves through which the plastic material flows may be easily machined or otherwise formed.

(3) The plastic material may flow through the axial grooves or radial holes at which velocities because the cross sectional area of the latter is small. Furthermore, as the plunger is reciprocated, there does exist the difference in velocity between the plastic material in axial grooves of the plunger and that on the inside wall surface of the head so that the plastic material adhering to the axial grooves is washed away. As a result, the plastic material is prevented from remaining in the extrusion head in excess of a predetermined time interval. When the plastic material flows through the radial holes at high velocities, it may effectively carry away the material adhering to the wall surfaces, whereby the material is prevented from remaining in the extrusion head in excess of a predetermined time interval. As a result, in the case of changing the plastic material to that of different composition or color, the cleaning agent or the like and labors may be considerably saved.

(4) The plastic material is accumulated as it is introduced into the extrusion head. Thus, the so-called the faster charged, the faster extruded operation may be ensured. As a result, the plastic material may remain uniformly for a predetermined time interval in the extrusion head, whereby the surface qualities, dimensions, stability, strength etc. of the extruded parisons may be improved and weld marks or the like may be eliminated.

(5) The flared recesses or annular or helical grooves are recessed in the cylindrical wall of the plunger adjacent to the tapered lower end thereof so that the plastic material may be uniformly distributed and accumulated in the accumulation chamber which is increased in volume as the plastic material is forced into the annular accumulation chamber.

What is claimed is:

1. In an extrusion head for use in blow molding machine having an extruder and supplied with resin wherein an outer periphery of a plunger is in contact with inner walls of a head body and an opening of a support plate, said head body and said support plate being located coaxial with the plunger, and inner periphery of the plunger being in contact with a core which is positioned coaxially with the plunger, said plunger being slidable in an axial direction, the improvement comprising: a feed port for supplying said resin from the extruder to the head body and being a horizontal hole formed in said support plate above the head body; a sealing block secured to said support plate and having a lower face abutting the upper part of said supply port, the supply port being extended to a lower face of said sealing block, said sealing block being fitted in a longitudinal groove formed axially on the outer periphery of the plunger thereby preventing the resin from remaining in the longitudinal groove in excess of a predetermined time interval when said plunger is slid vertically, said sealing block also preventing the resin from leaking when said plunger is slid vertically; an extended lower part of the longitudinal groove forming a flared portion widening in width in a circumferential direction of the plunger, a lower part of the flared portion being formed with a throttle which is annular in the circumferential direction of the plunger and shallower than the flared portion, an edge provided on the upper side of said flared portion for scraping off the material adhering to the inner peripheral surface of said head body during each extrusion of material; the side of the throttle portion toward a nozzle being at the lower end of the plunger; an accumulation chamber having a narrow annular flow path between the annular throttle portion and the head body, communicating with the flared portion; and the accumulation chamber being provided with an upper portion surrounded by said annular path and said lower end of the plunger, an outer periphery defined by the inner wall of the head body, an inner periphery defined by the outer wall of the core, and a lower portion extending to the nozzle.

2. An extrusion head as set forth in claim 1 wherein said flared portion is shaped such that the longitudinal groove is gradually widened to form a triangular groove on the plunger thereby surrounding the same at the angle of about 180°, whereby a lower side of the triangle covers the plunger in a semi-circular manner, the throttle portion being formed in a circle at the lower side of the triangle whereby the resin is circumferentially uniformly distributed into the accumulation chamber.

3. An extrusion head as set forth in claim 1 wherein said flared portion is shaped such that the longitudinal groove is abruptly widened to annularly surround the periphery of the plunger, the throttle portion being formed at a lower side of the flared portion whereby the resin is circumferentially uniformly distributed into the accumulation chamber.

* * * * *